I

US006988412B1

(12) United States Patent
Wilner

(10) Patent No.: US 6,988,412 B1
(45) Date of Patent: Jan. 24, 2006

(54) PIEZORESISTIVE STRAIN CONCENTRATOR

(75) Inventor: Leslie Bruce Wilner, Palo Alto, CA (US)

(73) Assignee: Endevco Corporation, San Juan Capistrano, CA (US)

( * ) Notice: Subject to any disclaimer, the term of this patent is extended or adjusted under 35 U.S.C. 154(b) by 0 days.

(21) Appl. No.: 11/000,512

(22) Filed: Nov. 30, 2004

(51) Int. Cl.
*G01L 9/16* (2006.01)
(52) U.S. Cl. ..................................................... 73/754
(58) Field of Classification Search ........... 73/700–756
See application file for complete search history.

(56) References Cited

U.S. PATENT DOCUMENTS

| | | |
|---|---|---|
| 3,995,247 A | 11/1976 | Kurtz |
| 4,498,229 A | 2/1985 | Wilner |
| 4,605,919 A | 8/1986 | Wilner |
| 4,737,473 A | 4/1988 | Wilner |
| 4,793,194 A | 12/1988 | Wilner |
| 5,425,841 A | 6/1995 | Kurtz et al. |
| 5,539,236 A | 7/1996 | Kurtz et al. |
| 5,773,728 A | 6/1998 | Tsukada et al. |
| 2003/0101828 A1 | 6/2003 | Omura et al. |

OTHER PUBLICATIONS

Krivorotov, N. P., et al., "Diaphragmless pressure sensor," Elsevier, *Sensors and Actuators A 113*, pp. 350-354, (2004).

*Primary Examiner*—William Oen
(74) *Attorney, Agent, or Firm*—Paul Davis; Heller Ehrman LLP

(57) ABSTRACT

A piezoresistive strain concentrator that converts mechanical movement into electrical output and a process for fabricating the concentrator are provided. The device includes a strain sensing structure composed of a piezoresistive strain sensitive element that spans a gap in a substrate. The strain sensing structure is supported on a strain concentrating structure also spanning the gap that has vertical walls extending to a cross-section at the base of the gap, both structures being etched from the substrate. The structure of the strain-concentrating support for the strain sensitive element is fabricated by deep reactive ion etch (DRIE). The strain sensing structure has an increased sensitivity, a low gage factor and an increased resistance to buckling and fracture compared to previous strain gage structures. Several of the strain sensing structures can be connected in a sequence in a bridge circuit.

24 Claims, 4 Drawing Sheets

PIEZORESISTIVE STRAIN CONCENTRATOR

BACKGROUND OF THE INVENTION

In pressure and acceleration sensors, it is desired to produce a relatively large signal power from a relatively small amount of energy absorbed from the medium. The goal is to minimize the mechanical energy necessary to produce a desired output signal. In pressure sensors, energy is absorbed from the medium as pressure deflects a diaphragm. Generally, a bar deeply notched at the center and its ends is placed across a diaphragm. Gages are placed on the plane surface opposite the notched bottoms. The strain of the bending bar is concentrated at the bottom of the notches. In acceleration sensors, energy is absorbed from the acceleration field as the seismic mass deflects relative to its reference frame. For example, a structure that is used features gages that are etched free from the substrate over an elastic hinge, a so-called "freed-gage." With the hinge carrying the transverse load and the gages much further from the neutral axis of bending than the outer surfaces of the hinge, the gages become the most highly strained material. In both the acceleration and pressure sensor, efficiency permits high sensitivity via a small physical size.

A common approach taken by manufacturers of transducers has been to create a large field of strained surface and to place onto the more strained areas strain gages of a convenient size. Alternatively, structural means have been used to concentrate strain in piezoresistors. In piezoresistive sensors, signal is produced by changing the resistance of one or more strain-sensitive resistors excited by an electric current. Hence, in a simple plane diaphragm pressure sensor with embedded gages, much of the periphery and a broad area of the center are brought to the state of strain needed to provide signal in the gages. Although gages are placed in areas of highest strain, much of the strain energy is expended in the periphery and center areas which lack strain gages.

In a freed-gage structure only the piezoresistive material sees the full level of strain; the hinge and force-gathering structures are much less strained. Though the freed strain gage was an improvement over previous strain gages, it is still not the optimal structure to detect strain. Manufacturing tolerances impose a minimum cross section on the freed-gage; hence, for the required signal power, some minimum amount of material must be strained. The manufacturing process also imposes an upper limit on the resistivity in the freed gage, which limits the gage factor and thus, the sensitivity of the gage. In addition, heat dissipation limits the length of a device, such that the gages must be stitched back and forth across a gap over a hinge until there is enough total length to give the needed resistance. Thus, there is still a need for a stress concentrating structure that overcomes the short-comings of the freed-gage structure.

SUMMARY OF THE INVENTION

The present invention relates to a strain sensitive element for use in a device that senses mechanical movement of at least two relatively movable parts and converts that movement into electrical output. The device comprises a substrate composed of silicon crystal material. The substrate includes a gap extending across a portion thereof and a cross-section that extends across the gap, defining the relative movable parts. At least one strain sensitive element is provided on the silicon substrate, having two end portions and a neck portion that extends across the gap. The neck portion of the strain sensitive element is supported on a strain concentrating structure that also extends across the gap. The strain concentrating structure has vertical walls extending to the cross-section at the base of the gap and is derived from the same material as the substrate. Electrode means, electrically connected to the end portions are provided to detect changes in electrical resistance between the end portions, when the neck portion is subjected to stress in the direction of a current through the strain sensitive element that results from the relative movement of the substrate parts. In one embodiment, the silicon substrate is oriented in the (110) plane and comprises an n-type impurity with the strain sensitive element aligned in the [111] direction and comprising a p-type impurity. In another embodiment, the silicon substrate is oriented in the (100) plane and comprised of a p-type impurity with the strain sensitive element aligned in the [001] direction and comprised of an n-type impurity.

In another aspect of the invention, at least two strain sensitive elements connected in a series are provided on the silicon substrate and are supported by corresponding strain concentrating structures of a device that senses mechanical movement of at least two relatively movable parts and converts that movement into electrical output. In a further embodiment, six strain sensitive elements connected in a series are provided on a silicon substrate and supported by corresponding strain concentrating structures. The strain sensitive elements are heavily doped and have a small cross-sectional width.

In another embodiment, the device of the present invention is made from a silicon substrate derived from n-type semi-conductive material oriented in the (110) plane. One surface of the substrate includes a triple-bossed diaphragm. The other surface of the substrate includes four gaps extending across a portion of the substrate defining a flexible cross-section and the relative moveable parts. Four strain sensitive element pairs are provided on the silicon substrate around the gaps, each strain sensitive element having two end portions interconnected by an intermediate neck portion that extends across the gap. Each neck portion is supported on a corresponding strain concentrating structure that extends across the gap that has vertical walls extending to the cross-section at the base of the gap and is derived from the same material as the substrate. The four strain sensitive element pairs derived from p-type semi-conductive material and oriented in the [111] direction are connected as a bridge circuit. In a preferred embodiment, the bridge circuit is a Wheatstone bridge circuit. Electrode means, electrically connected to the end portions are provided to detect changes in electrical resistance between the end portions, when the neck portions are subjected to stress in the direction of a current through the strain sensitive elements that results from the relative movement of the substrate parts. An insulated crossover on the substrate at the level of the strain sensitive element connects the strain sensitive elements in a bridge circuit sequence such that adjacent legs of the bridge have opposite senses of strain.

In another embodiment, the device includes a reference cavity to capture a reference pressure and is adapted for deposit on a catheter to measure fluid pressure.

The invention also relates to a method of fabricating a device for sensing mechanical input and converting mechanical movement of at least two relatively movable parts into electrical output. The method comprises: fabricating a sensor wafer from which the diaphragm and strain sensitive elements are fabricated and a support wafer for mechanical rigidity of the sensor wafer; aligning and bonding the sensor and support wafers; and deep reactive ion etching (DRIE) the diaphragm and strain sensitive elements areas. In one embodiment of the invention, the sensor wafer is made from a single silicon crystal of an n-type impurity, having a main face with a (110) orientation, with the [111] direction identified and two flat polished sides having thermally grown oxide on both surfaces.

A method of fabricating the sensor wafer comprises: heavily diffusing p-type boron into the conduction areas on the sensor surface; photopatterning the surface and opening links to strain sensitive elements; lightly diffusing p-type boron onto the strain sensitive elements through areas opened on the surface; and deep reactive ion etching the photopatterned areas to form the diaphragms and structures supporting the strain sensitive elements.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1A:
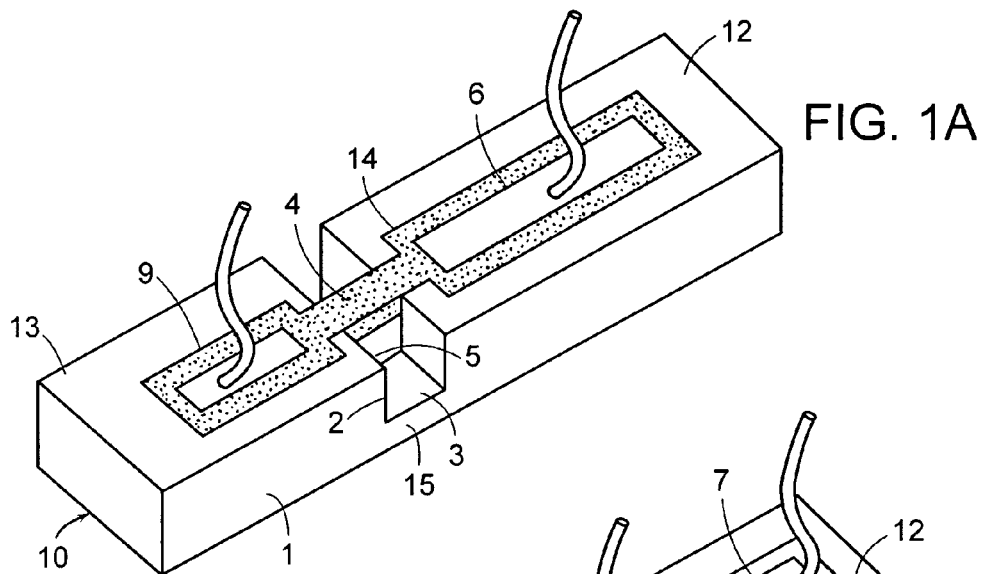
FIG. 1A is a view in perspective of a piezoresistive device in accordance with the present invention in which a single strain sensitive element and a strain-concentrating support structure are depicted on the substrate.
Figure 1B:
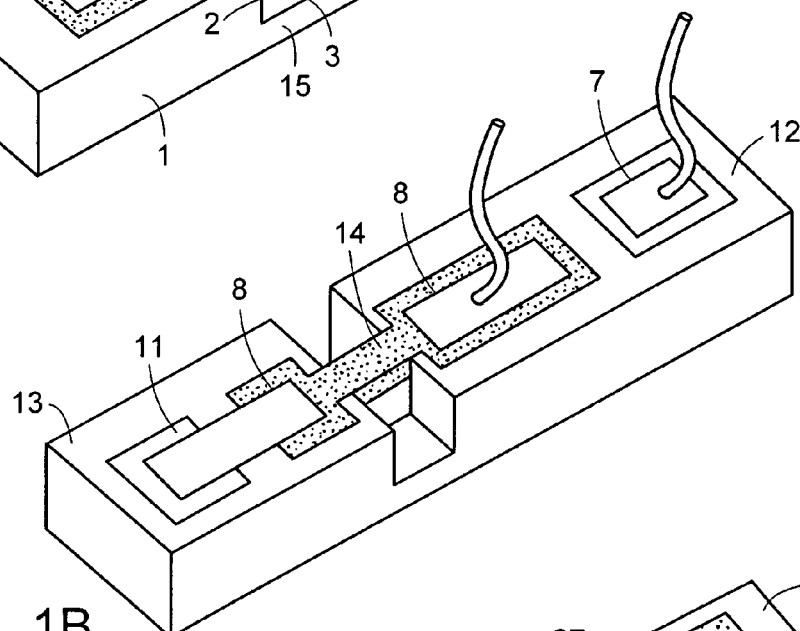
FIG. 1B is a view in perspective of the embodiment in FIG. 1A having both electrical connections on the fixed side of the device.

A description of the preferred embodiments of the invention follows. Referring to FIG. 1A, there is shown a piezoresistive device 10, illustrating the invention, with a silicon substrate 1, having a gap 2 separating relatively movable substrate ends 12 and 13. Defined within gap 2 is a flexible cross-section 3 that spans gap 2. As can be seen in FIG. 1A, a neck portion 4 of strain sensitive element 14 extends over gap 2, supported on a strain concentrating structure 5. Strain sensitive element 14 is isolated from the bulk of the substrate by a p-n junction. The strain sensitive element 14 can be lightly doped e.g., with boron to a suitable depth such as about 2 microns. Neck portion 4 of strain sensitive element 14, is connected to electrical pads 6 and 9 at each end thereof. Alternatively, in FIG. 1B both electrical connections are on a fixed end of the device, substrate end 12. Ohmic contacts 7 and 11 are near the end of substrate ends 12 and 13, respectively, having between them the conductivity of the substrate. On a movable end of the substrate, substrate end 13, piezoresistor 14 is connected to adjacent ohmic contact 8. Functional connections to piezoresistor 14 are then ohmic contacts 11 and 8 on substrate end 13.

As will be appreciated, flexible cross-section 3 defines an elastic hinge 15 that is parallel to substrate 1 and determines the direction of flexibility of movable substrate ends 12 and 13. Force applied planar to substrate 1 will cause substrate ends 12 and 13 to tilt relative to each other around hinge 15 of cross-section 3, creating strain on strain concentrating structure 5 that is transmitted to neck portion 4 of strain sensitive element 14 and sensed electrically via electrical pads 6 and 9. In particular, changes are detected in electrical resistance when the neck portion is subjected to stress in the direction of current through the strain sensitive element that results in the relative movement of the parts.

Figure 2:
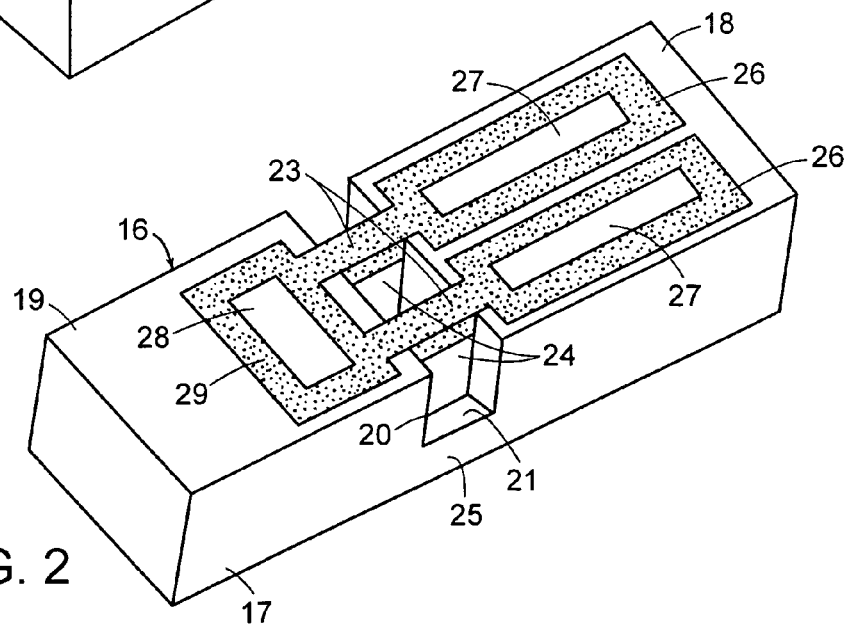
FIG. 2 is a view in perspective of a second embodiment of the invention in which two strain sensitive elements in a series and their corresponding strain-concentrating support structures are depicted on the substrate.

Referring to FIG. 2, piezoresistive device 16 is shown with two strain sensitive elements 23 arranged in a manner similar to that described above. Substrate 17 having a gap 20, spanned by strain sensitive elements 23 are supported by strain concentrating structures 24 that are perpendicular to flexible cross-section 21 which defines elastic hinge 25. Both strain sensitive elements 23 can be lightly doped to a depth of about 2 microns. The dual strain sensitive elements 23 have individual electrical pads 26 on substrate end 18 and electrical pad 29 on substrate end 19. Electrical pads 26 have electrical contact terminals 27 positioned thereon, while electrical pad 29 contains electrical contact terminal 28. Electrical contact terminals 28 and 27 may be composed of metal.

Figure 6:
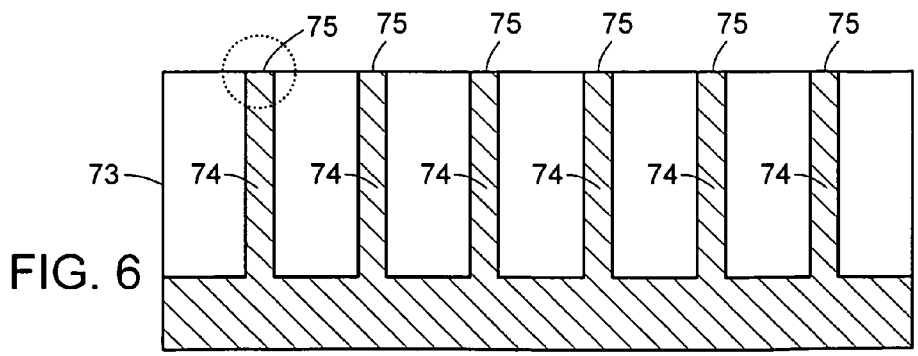
FIG. 6 is a side cross-sectional view of an embodiment of the invention in which six strain sensitive elements in a series and their corresponding strain-concentrating support structures are depicted on the substrate.

FIG. 6 shows a cross-section of piezoresistive device 73, which is depicted with six strain sensitive elements 75. Each strain sensitive element is supported on a corresponding strain concentrating structure 74. In this embodiment, strain sensitive elements 75 are preferably heavily doped with boron to a depth of approximately 0.3 microns, allowing the strain sensitive element to have a very small cross-sectional width C2 of about 4 microns, for instance.

In piezoresistive devices 10, 16 and 73 the silicon substrate can be oriented in the (110) plane and comprised of an n-type impurity with the strain sensitive element aligned in the [111] direction and comprised of a p-type impurity. Alternatively, the silicon substrate of the devices can be oriented in the (100) plane and comprised of a p-type impurity with the strain sensitive element aligned in the [001] direction and comprised of an n-type impurity.

Figure 3A:
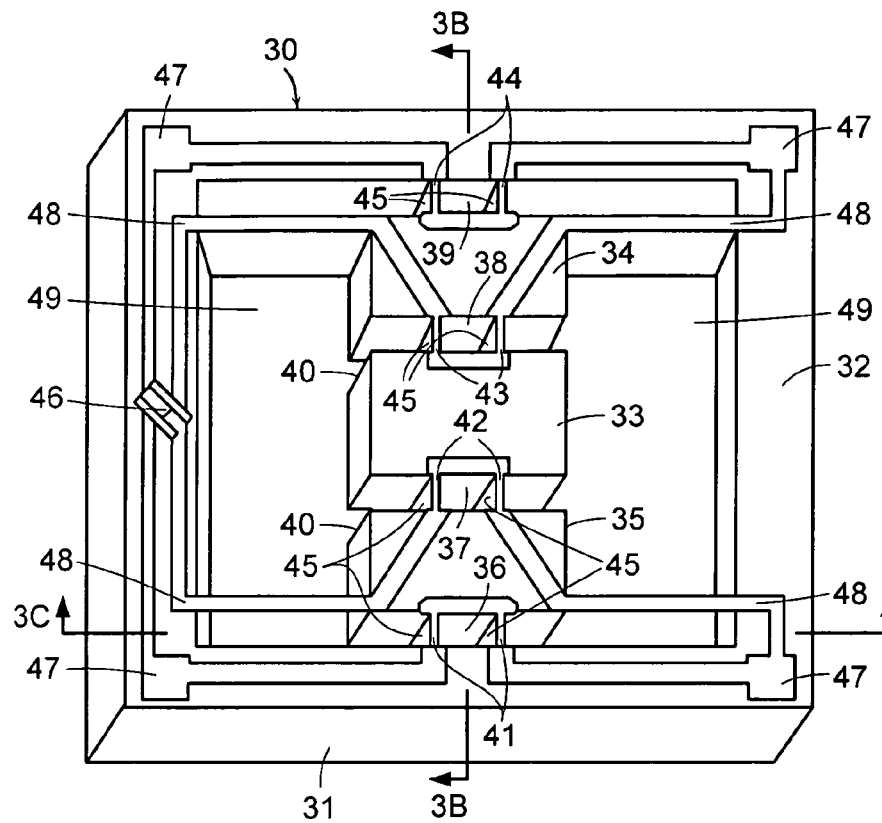
FIG. 3A is a view in perspective of a third embodiment of the invention in which four pair of strain sensitive elements and their corresponding strain-concentrating support structures extend respectively across four gaps that span the substrate and are connected in a bridge circuit.
Figure 3B:
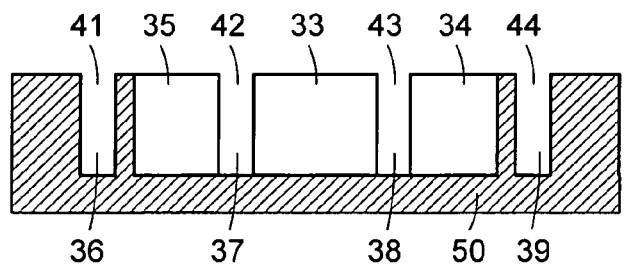
FIG. 3B is a side cross-sectional view of the embodiment in FIG. 3A along the 3B line.
Figure 3C:
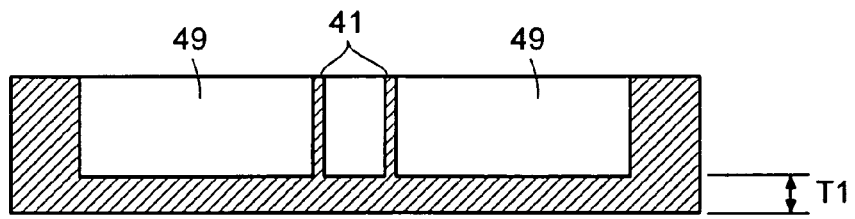
FIG. 3C is a side cross-sectional view of the embodiment in FIG. 3A along the 3C line.

Referring now to FIGS. 3A–3C, a piezoresistive stress concentrator 30 is shown, illustrated by a device made from silicon substrate 31. Functionally, stress concentrator 30 is composed of four stress concentrators of the type shown in FIG. 2 that are incorporated into a pressure sensor. As can be seen in FIG. 3B, sculpted on one side of substrate 31 is triple-bossed diaphragm 50, composed of central boss 33 and two outer bosses 34 and 35. Four gaps extend across a portion of the substrate 31, such that outer gap 36 is outside of outer boss 35, inner gap 37 is between outer boss 35 and central boss 33, inner gap 38 is between central boss 33 and outer boss 34 and outer gap 39 is outside of outer boss 34. Torsion bar conduction paths 48 run along outer bosses 34 and 35, to terminals 47 on rim 32 that extend across diaphragm 50. In response to pressure applied to one surface, diaphragm 50 will deflect, with central boss 33 moving plane parallel to the rim 32 and outer bosses 34 and 35 tilting relative to rim 32. Turning to FIG. 3A, defined within each gap are flexible cross-sections 40. Four strain sensitive element pairs 41, 42, 43 and 44 are provided on the surface of substrate 31 around gaps 36, 37, 38 and 39 respectively with each strain sensitive element within the pair supported on stress concentrating structures 45. Each strain sensitive element can be doped with boron, preferably to a level of approximately $3 \times 10^8$ per cubic centimeter. The strain sensitive element pairs are connected in an electronic bridge circuit sequence, such as a Wheatstone bridge, the inner strain sensitive elements 42 and 43 wired to terminals 47 at the corners of substrate 31 via torsion bar conduction paths 48 such that adjacent legs of the bridge have opposite senses of strain and change in resistance. Insulated crossover 46 accommodates the physical geometry of the device as it relates to formation of a bridge circuit. As seen in FIG. 3A, trenches 49 are cut on either side of the conduction path to a depth leaving the thickness T1 shown in FIG. 3C. The stress concentrator may be cemented to a support and wired to a circuit, or the support and connecting functions may be provided by a single complex structure applied to the terminal surface.

With pressure applied to the planar surface, deflection of the bosses of the diaphragm occurs as described above, causing outer strain sensitive elements 41 and 44 to become compressed and the inner strain sensitive elements 42 and 43 to become stressed, mechanical movement that the piezoresistive strain sensitive elements detect as a change in resistance. In a balanced bridge circuit, the change in resistance due to deflection unbalances the bridge to provide an electrical output signal.

Figure 4A:
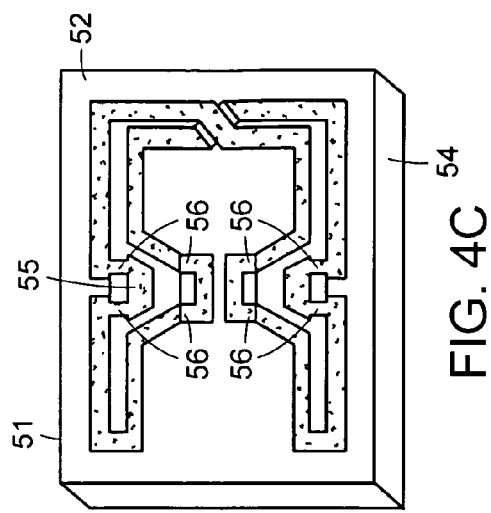
FIGS. 4A–4F are views in perspective illustrating a sequential process of fabricating a sensor wafer.
Figure 4B:
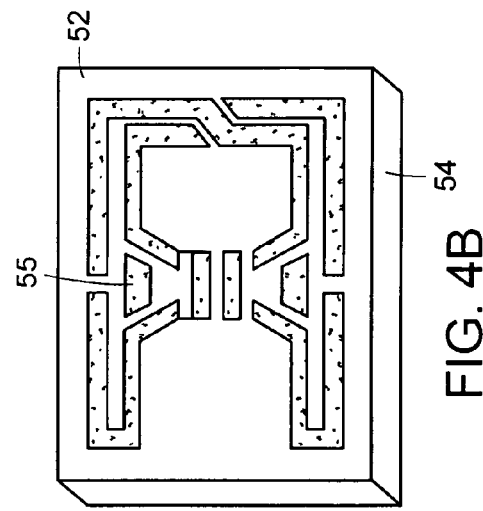
Figure 4C:
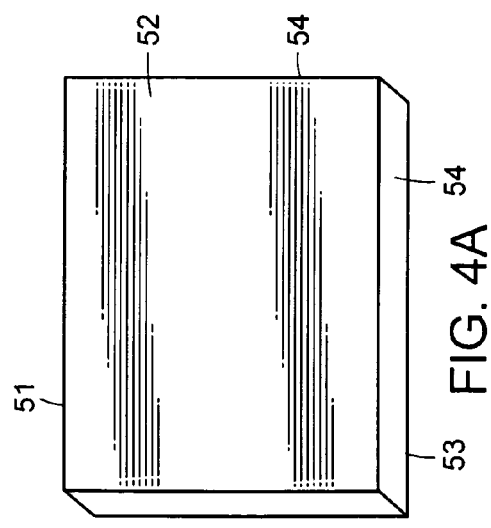
Figure 4D:
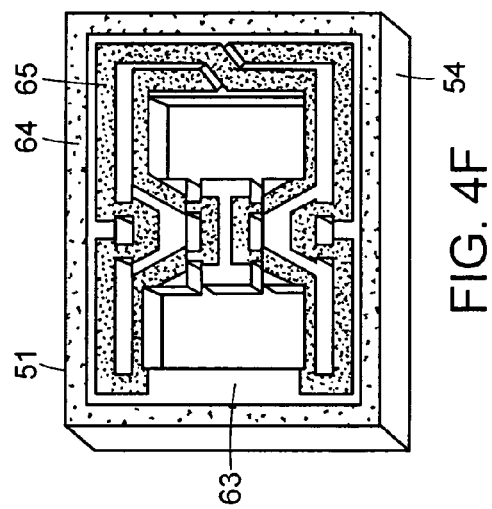

Referring now to FIGS. 4A–4F, a sequence of steps is shown for fabricating the sensor wafer portion of piezoresistive stress concentrator 30. As illustrated in FIG. 4A, a single crystal n-type silicon substrate 51 has a main face with a (110) orientation, two flat polished sides 54 in the [111] direction and has formed a thermal oxidized layer 52 on the top surface and an oxidized layer 53 on the bottom surface. In an embodiment, the total thickness variation of the sensor wafer is about 2 microns. As can be seen in FIG. 4B, a preliminary heavy diffusion of p-type boron is made into areas 53 which will serve as conductors on the sensor surface. FIG. 4C shows the photopatterning of the surface and opening of the oxide for a light diffusion of boron onto strain sensitive elements 56. In an embodiment, strain sensitive elements 56 can be lightly diffused with at least $3 \times 10^{18}$ boron, to a depth of about 1.1 microns and 265 ohms per square. In FIG. 4D, the surface of substrate 51 is masked against deep reactive ion etching (DRIE) with sputtered aluminum 60, and the DRIE pattern opened in the aluminum to form the diaphragm, stress concentrating structures 57 to support strain sensitive elements 56, flexible cross-sections 58 and trenches 59 on either side of conduction path 55.

Figure 4E:
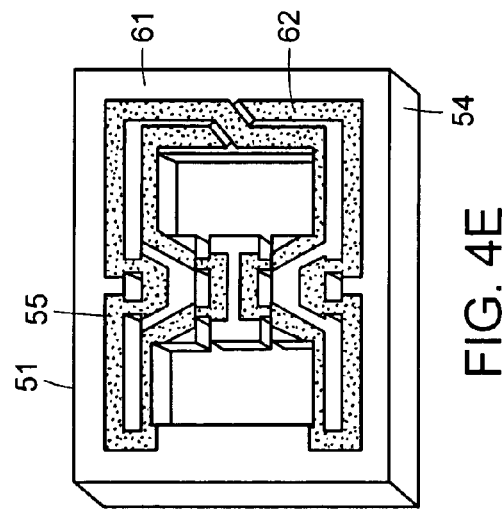
Figure 4F:
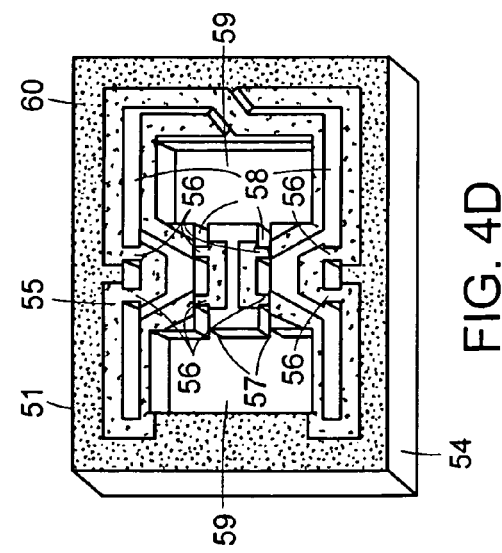

Substrate 51 is etched with DRIE to a final depth that is about 28 percent of the original wafer thickness. As shown in FIG. 4E, sputtered aluminum 60 from FIG. 4D is removed and a thin oxide 61 is grown on the surface. Conduction path 62 is photopatterned and contact holes opened through the oxide. In FIG. 4F, aluminum 63 is deposited on the surface of substrate 51 to a depth of about 0.7 microns and the surface photopatterned to define electrical traces 65 and thermocompression bonding sites 64.

A support wafer necessary for mechanical rigidity and electrical connection is also fabricated. The support wafer is composed of a single silicon crystal of an n-type impurity. To form the complete piezoresistive device, the sensor wafer is aligned with the support wafer and the two wafers thermocompression bonded.

Figure 5A:
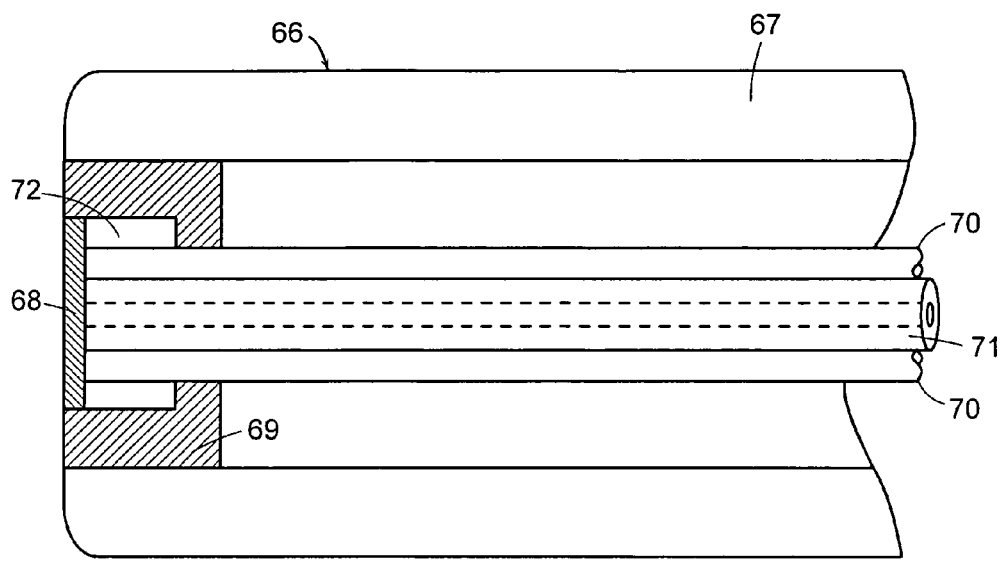
FIG. 5A is a cross-sectional view of a fourth embodiment of the invention of a catheter featuring a pressure sensor to measure fluid pressure.
Figure 5B:
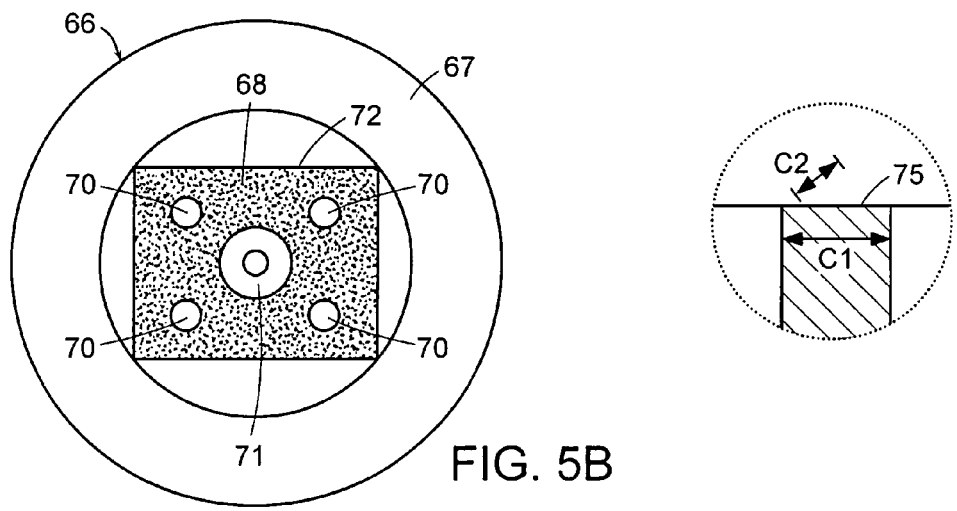
FIG. 5B is the view of the back end of the embodiment in FIG. 5A.

Referring to FIGS. 5A and 5B, a catheter 66 employing a piezoresistive pressure sensor 72 illustrates an embodiment of the invention. A reference pressure tube 71 is epoxy-sealed to pressure sensor 72. Silicone elastomer 69 also seals pressure sensor 72 to reference tube 71. Silver-plated copper wires 70 connect to terminals of pressure sensor 72. A face 68 of pressure sensor 72 may be coated with a thin film of tantalum. A support wafer can be bonded to pressure sensor 72 which provides both electrical vias for the terminals and a plumbing via for reference tube 71. The catheter can be used to measure fluid pressure.

As will be appreciated from the discussion of the above, the invention provides a device and a process for fabricating a device that senses mechanical movement and converts that movement into electrical output through a strain concentrating structure that supports a strain sensitive element. The invention improves over prior gage structures in several ways. For instance, having the strain sensitive element supported on a strain-concentrating support structure eliminates the process constraint on resistivity, allowing the resistivity to only be constrained by acceptable thermal behavior of the strain sensitive element. The supported strain sensitive element can be doped with boron at one-tenth or less of the levels of that of the freed-gage structure, resulting in higher sensitivity to strain. Unlike in the freed-gage structure, the material on the supported strain sensitive element does not need to resist etching, and thus can be chosen for more desired properties like a high gage factor and matched temperature coefficients of resistance and gage factor. Hence, the supported strain sensitive element is heat-sunk by its support; the resistive heat generated in the element is carried away not only along the length of the element, but also downward into the support. Finally, the strain-concentrating structure of the strain sensitive element is much more resistant to buckling under compressive load than the freed-gage structure, making it much less brittle.

While this invention has been particularly shown and described with references to preferred embodiments thereof, it will be understood by those skilled in the art that various changes in form and details may be made therein without departing from the scope of the invention encompassed by the appended claims.

What is claimed is:

1. A device for sensing mechanical input and converting mechanical movement of at least two relatively movable parts into electrical output, comprising:
   a silicon substrate;
   a gap extending across a portion of the substrate defining the relative moveable parts and a flexible cross-section extending there between, the cross-section derived from the same material as the substrate;
   at least one strain sensitive element provided on the surface of the silicon substrate, the strain sensitive element having two end portions interconnected by an intermediate neck portion, the neck portion being supported on a structure that concentrates strain, the structure extending across the gap and having vertical walls extending to the cross-section in the gap and the structure derived from the same material as the substrate; and electrode means electrically connected to the end portions for detecting changes in electrical resistance between the end portions, when the neck portion is subjected to stress in the direction of a current through the strain sensitive element that results from the relative movement of the substrate parts.

2. The device of claim 1 wherein the silicon substrate is oriented in the (110) plane and comprises an n-type impurity and the strain sensitive element is aligned in the [111] direction and comprises a p-type impurity.

3. The device of claim 1 wherein the silicon substrate is oriented in the (100) plane and comprised a p-type impurity and the strain sensitive element is aligned in the [001] direction and comprises an n-type impurity.

4. The device of claim 1 wherein the cross-section defines an elastic hinge parallel to the substrate.

5. The device of claim 1 wherein the at least two relatively moveable parts tilt relative to each other about the elastic hinge portion of the cross-section.

6. The device of claim 1 wherein the strain sensitive element comprises boron lightly doped to a depth of about 2 microns.

7. A device for sensing mechanical input and converting mechanical movement of at least two relatively movable parts into electrical output, comprising: a silicon substrate;

a gap extending across a portion of the substrate defining the relative moveable parts and a flexible cross-section extending there between, the cross-section derived from the same material as the substrate;

at least two strain sensitive elements provided on the surface of the silicon substrate and connected in series, each of the strain sensitive elements having two end portions interconnected by an intermediate neck portion, each neck portion being supported on a corresponding structure that concentrates strain, the structure extending across the gap and having vertical walls extending to the cross-section in the gap and the structures derived from the same material as the substrate; and electrode means electrically connected to the end portions for detecting changes in electrical resistance between the end portions when the neck portions are subjected to stress in the direction of a current through the strain sensitive elements that results from the relative movement of the substrate parts.

8. The device of claim 7 wherein the silicon substrate is oriented in the (110) plane and comprises an n-type impurity and the strain sensitive elements are aligned in the [111] direction and comprise a p-type impurity.

9. The device of claim 7 wherein the silicon substrate is oriented in the (100) plane and comprised a p-type impurity and the strain sensitive elements are aligned in the [111] direction and comprise an n-type impurity.

10. The device of claim 7 wherein the cross-section defines an elastic hinge parallel to the substrate.

11. The device of claim 7 wherein the at least two relatively moveable parts tilt relative to each other about the elastic hinge portion of the cross-section.

12. The device of claim 7 wherein each strain sensitive element comprises boron lightly doped to a depth of about 2 microns.

13. The device of claim 7 wherein six strain sensitive elements are provided on the surface of the silicon substrate and connected in series.

14. The device of claim 13 wherein each strain sensitive element comprises boron heavily doped to a depth of about 0.3 microns.

15. The device of claim 13 wherein each strain sensitive element has a small width of about 4 microns.

16. A device for sensing mechanical input and converting mechanical movement of at least two relatively movable parts into electrical output, comprising:

a silicon substrate derived from n-type semi-conductive material oriented in the (110) plane;

a triple-bossed diaphragm sculpted on one side of the substrate, the triple-bossed diaphragm comprising a rim, a diaphragm extending across the rim, a central boss and two outer bosses on either side of the central boss and inside of the rim;

four gaps extending across a portion of the substrate defining the relative moveable parts and flexible cross-sections extending between corresponding gaps such that two of the gaps are located outside the outer bosses and two of the gaps are located on either side of the central boss and inside of either outer boss;

four strain sensitive element pairs provided on the surface of the silicon substrate around the gaps, each pair comprising two strain sensitive elements connected in a series, each strain sensitive element having two end portions interconnected by an intermediate neck portion, the neck portion being supported on a corresponding structure that concentrates strain, the structure extending across the gap and having vertical walls extending to the cross-section in the corresponding gap, the strain sensitive elements derived from p-type semi-conductive material and oriented in the [111] direction, the four strain sensitive element pairs connected as a bridge circuit; and electrode means electrically connected to the end portions of the strain sensitive elements for detecting changes in electrical resistance between the end portions, when the neck portions are subjected to stress in the direction of a current through the strain sensitive elements that results from the relative movement of the substrate parts.

17. The device of claim 16 wherein the cross-section defines an elastic hinge parallel to the substrate.

18. The device of claim 16 wherein the at least two relatively moveable parts tilt relative to each other about the elastic hinge portion of the cross-section.

19. The device of claim 16 further comprising an insulated crossover at the gage level on the substrate such that the strain sensitive elements are connected to terminals at the corners of the rim in a bridge circuit sequence such that adjacent legs of the bridge have opposite senses of strain.

20. The device of claim 16 further comprising a torsion bar conduction path from the tilting boss to the terminals on the rim.

21. The device of claim 16 further comprising a reference cavity in the terminal block sealed by thermocompression bonds to capture a reference pressure.

22. The device of claim 16 wherein the strain sensitive elements are sealed to a surface mount terminal by thermocompression bonds.

23. The device of claim 16 wherein each strain sensitive element comprises boron doped to a level of approximately $3 \times 10^{18}$ per cubic centimeter.

24. The device of claim 16 adapted for deposit on a catheter to measure fluid pressure.

* * * * *